United States Patent [19]

Lambert et al.

[11] 3,885,080

[45] May 20, 1975

[54] CELLULOSIC FILM BASE ASSEMBLY

[75] Inventors: Frank Percy Lambert, Homchuck; Edward William Lee, Romford, both of England

[73] Assignee: Ilford Limited, England

[22] Filed: Oct. 12, 1972

[21] Appl. No.: 297,086

[30] Foreign Application Priority Data
Nov. 3, 1971 United Kingdom............... 51157/71

[52] U.S. Cl................. 428/336; 96/87 R; 260/13; 260/75 TN; 428/424; 428/425
[51] Int. Cl.............................................. B44d 1/16
[58] Field of Search........... 96/87 R; 117/76 F, 145, 117/73, 76 P; 260/13, 75 TN

[56] References Cited
UNITED STATES PATENTS

| | | |
|---|---|---|
| 2,698,241 | 12/1954 | Saner................................. 96/87 R |
| 2,698,242 | 12/1954 | Saner................................. 96/87 R |
| 3,192,287 | 6/1965 | Pelzek et al. ................... 117/145 X |
| 3,489,597 | 1/1970 | Parker ................................. 117/73 |
| 3,495,984 | 2/1970 | Vanpoecke et al.............. 117/76 X |

*Primary Examiner*—Michael R. Lusignan
*Attorney, Agent, or Firm*—Wenderoth, Lind & Ponack

[57] ABSTRACT

Cellulosic Film base assembly which comprises a cellulosic film base bearing on at least one side thereof a subbing layer not more than $1\mu$ thick which layer comprises a mixture of a cellulosic polymer and a polyester based polyurethane which contains no free isocyanate groups and which is soluble in ethanol and-/or acetone.

9 Claims, No Drawings

CELLULOSIC FILM BASE ASSEMBLY

It is often required to coat on to cellulosic film base, e.g. nitrocellulose, cellulose triacetate or cellulose acetate butyrate, relatively thick lacquer coatings. That is to say lacquer coatings which are between 5 and 25 $\mu$ thick. In order to ensure that adequate adhesion is obtained between the lacquer coating and the cellulosic film base it is usually required that the lacquer coating liquid is coated on to the film base in the presence of an attacking solvent which swells the surface of the film base. An example of such a solvent is acetone. However the effect of coating in the presence of such solvents is to cause grave base distortion when the base is relatively thin, i.e. less than 100 $\mu$.

It is the object of the present invention to provide a cellulosic film base assembly on to which a relatively thick lacquer coating can be coated with a minimum of base distortion and to which the lacquer layer adheres well.

According to the present invention there is provided a cellulosic film base assembly which comprises cellulosic film base bearing on at least one side thereof a subbing layer not more than 1 $\mu$ thick which layer comprises a mixture of a cellulosic polymer and a polyester-based polyurethane which contains no free isocyanate groups and which is soluble in ethyl alcohol and/or acetone.

Examples of cellulosic film bases are nitro-cellulose, cellulose triacetate and cellulose acetate butyrate each of which have been cast as self-supporting film webs.

Examples of cellulosic polymers are nitro-cellulose, cellulose esters such as acetate, triacetate, propionate, acetate propionate and acetate-butyrate and cellulose ethers such as ethyl cellulose.

Examples of polyester-based polyurethanes (Elastomers E) which contain no free isocyanate groups and which are soluble in ethyl alcohol and/or acetone are polyurethanes which have been formed by reacting:

a. 1 mol of a linear hydroxyl-group-terminated polyester of a saturated aliphatic glycol having from 4 to 10 carbon atoms and a dicarboxylic acid represented by the formula HOOC—R—COOH where R is an alkylene radical containing from 2 to 8 carbon atoms or the anhydride of the dicarboxylic acid and, b. from about 1.1 to 3.1 mols of a diphenyl diisocyanate having an isocyanate group on each phenyl nucleus e.g. p,p'-diphenylmethane di-isocyanate, and from about 0.1 to 2.1 mols of a saturated aliphatic free glycol containing from 4 to 10 carbon atoms and having hydroxyl groups on its terminal carbon atoms, the molar amount of the polyester and free glycol combined being essentially equivalent to the molar amount of diphenyl diisocyanate so there are essentially no unreacted isocyanate or hydroxyl groups in the product. A suitable dibasic acid for use in the preparation of the ester is adipic acid and a suitable aliphatic glycol is butanediol — 1.4.

Polyester based polyurethanes having this composition are described in the British Patent Specification No. 849,136 and examples of such polyester-based polyurethanes are the polyurethane elastomer resins produced by the B.F. Goodrich Chemical Co. and known as Estane Resins. An Estane resin of particular use in the assembly of the present invention is known at the date of this patent application as Estane 5715.

The preferred range of polyurethane to cellulosic polymer to be used in the layer on the cellulosic film base is from 2 parts of the polyurethane to 1 part of the cellulosic polymer to 1 part of the polyurethane to 2 parts of the cellulosic polymer, the parts being by weight.

It is necessary to coat the polyurethane/cellulosic polymer subbing layer on to the cellulosic film support using swelling solvents, however preferably this coating is carried out when the presence of such solvents will not distort the base. Therefore most preferably the subbing layer is coated on the film base during the last stage in the manufacture of the film base itself while the casting solvents used in the casting of the film base are still present in the base and before they have been completely removed by a final drying process.

However even when the said polyurethane/cellulosic subbing layer is coated on the cellulosic film base after all the coating solvents have been removed very little distortion of the film base is caused because of the relatively thin nature of this subbing layer compared with the relatively thick lacquer coating which therefore contains much more swelling solvent.

A lacquer layer may be coated on the polyurethane/cellulosic polymer subbing layer without any swelling solvents being present in the coating mixture. Thus virtually no base distortion is caused when the lacquer layer is coated on to the subbed base.

According to the present invention there is also provided film material which comprises cellulosic film base bearing on at least one side a layer which comprises a mixture of a cellulosic polymer and a polyester-based polyurethane which contains no free isocyanate groups and which is soluble in ethyl alcohol and/or acetone, there being present on this said layer a lacquer layer.

Examples of lacquer layers which may be coated on to the film assembly of the present invention are cellulosic polymers e.g. nitrocellulose, other lacquers are for example polyvinyl acetal, phenoxy resins, and polyesters.

Such lacquer layers may be of use as dye receptive layers.

The lacquer layers may also comprise pigments e.g. magnetic oxide particles to form a magnetic oxide layer, titanium or silica particles to form a tooth-providing layer, or carbon black or other coloured pigments to form a coloured layer.

There may also be present on the reverse side of the film base assembly on the side distal to the polyurethane/cellulosic polymer subbing layer a gelatin subbing layer which has coated thereon a photographic silver halide emulsion layer. In material of this type the polyurethane/cellulosic polymer subbing layer acts as an anti-curl backing layer and helps to prevent the film base curling when the photographic material is processed and dried after light exposure.

EXAMPLE

On to three strips of cellulose triacetate film base there was coated, (per square foot of film base) the following coatings:

| | | |
|---|---|---|
| (a) | Cellulose acetate | 0.16 g |
| | Elastomer "E" (Estane 5715) | 0.33 g |
| | Acetone | 60 ml |
| | Methylene chloride | 20 ml |

-Continued

|     | | |
| --- | --- | --- |
|     | Methanol | 20 ml |
| (b) | Cellulose acetate | 0.5 g |
|     | Acetone | 60 ml |
|     | Methylene chloride | 20 ml |
|     | Methanol | 20 ml |
| (c) | Elastomer "E" (Estane 5715) | 0.5 g |
|     | Acetone | 60 ml |
|     | Methylene chloride | 20 ml |
|     | Methanol | 20 ml |

On to each of the above prepared assemblies carrying coatings together with a strip of cellulose triacetate film base which had not been sub-coated there was coated as stripes a liquid coating which had the following composition:

| | |
| --- | --- |
| Carbon black particles | 4 gms |
| Cellulose nitrate | 4 gms |

Methyl isobutyl ketone (a non swelling solvent) 100 ml

The carbon black coating composition was fount to adhere very well to the film base coated with layer (a). However the adhesion of the carbon black coating composition was poor on the film base coated with layers (b) and (c) while in the case of the film base which carried no sub-layer no adherent coatings on the base at all could be obtained.

When acetone which is an attacking solvent was added to the carbon black coating composition and this composition was coated on the film base the composition adhered well to film base carrying layers (a), (b) and (c) and the un-subbed film base. However base distortion was present in all the thus coated film assemblies.

What we claim is:

1. A cellulosic film base assembly which comprises a nitrocellulose cell pse triacetate or cellulose acetate-butyrate film base bearing in order on at least one side thereof a protective layer not more than 1 $\mu$ thick which layer comprises a mixture of a cellulosic polymer and a polyester-based polyurethane which contains no free isocyanate groups and which is soluble in ethyl alcohol or acetone or a mixture of ethyl alcohol and acetone and, coated on said protective layer, a lacquer layer, the range of polyurethane to cellulosic polymer to be used in the layer on the cellulosic film base being from 2 parts by weight of the polyurethane to 1 part by weight of the cellulosic polymer to 1 part by weight of the polyurethane to 2 parts by weight of the cellulosic polymer.

2. A cellulosic film base assembly according to claim 1 wherein the cellulosic polymer is nitrocellulose, cellulose acetate, cellulose triacetate, cellulose propionate, cellulose acetatepropionate, cellulose acetate-butyrate or ethyl cellulose.

3. A cellulosic film base assembly according to claim 1 wherein the polyester based polyurethane has been formed by reacting a di-isocyanate with at least an equivalent weight of polyester having terminal hydroxy groups.

4. A cellulosic film base assembly according to claim 1 wherein the lacquer layer is a cellulosic polymer, polyvinyl acetal, a phenoxy resin or a polyester.

5. A cellulosic film base assembly according to claim 3 wherein the di-isocyanate is p,p'-diphenylmethane di-isocyanate.

6. A cellulosic film base assembly according to claim 3 wherein the polyester having terminal hydroxy groups has been made by reacting adipic acid with an excess of butanediol-1,4.

7. A cellulosic film base assembly according to claim 4 wherein the lacquer layer is a nitrocellulose layer.

8. A cellulosic film base assembly according to claim 7 wherein the lacquer layer comprises a pigment.

9. A cellulosic film base assembly according to claim 8 wherein the pigment is magnetic oxide titanium silica or carbon black particles.

* * * * *